Feb. 28, 1939. R. E. KEYS 2,148,756
FILM HANDLING DEVICE
Filed Aug. 21, 1937
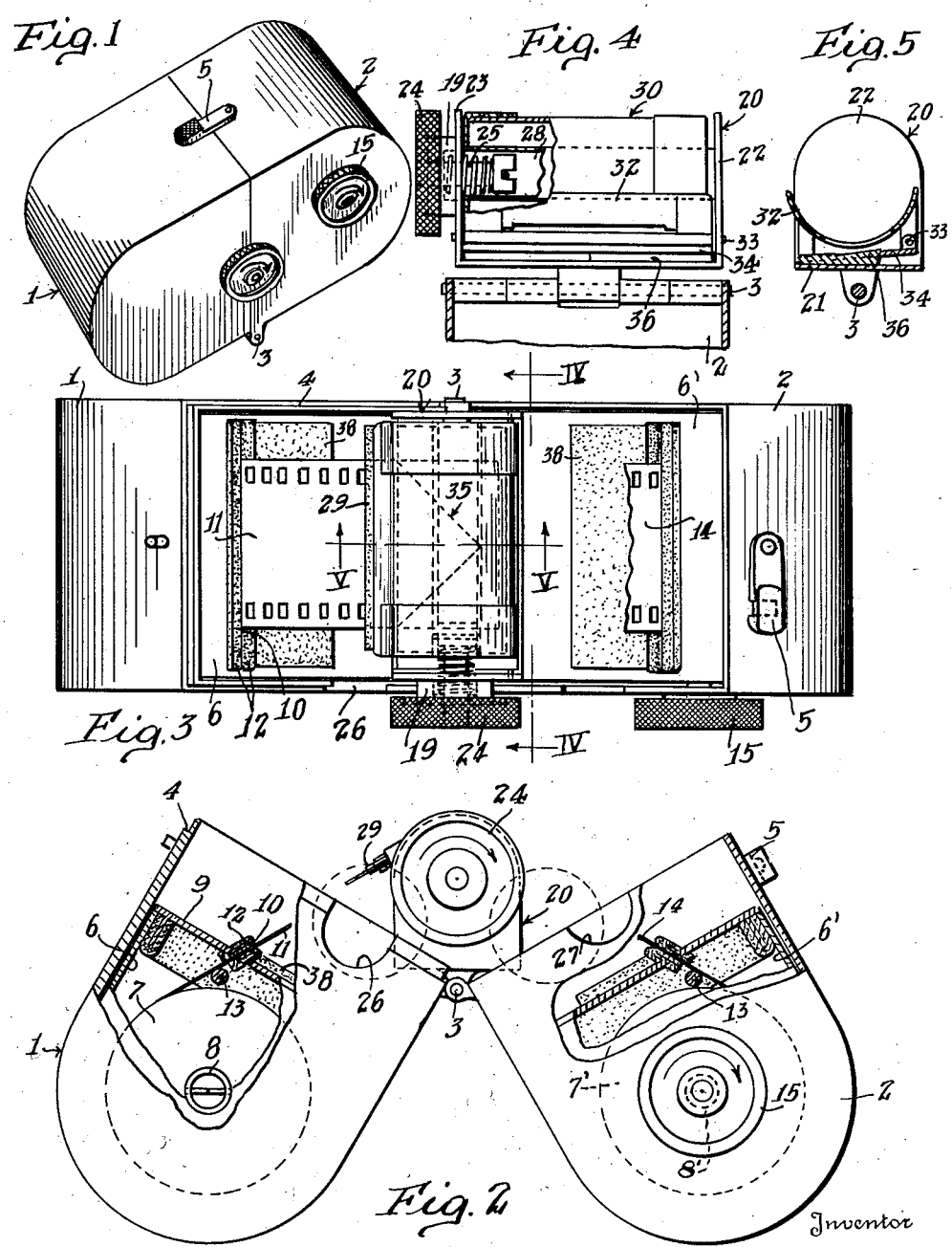

Patented Feb. 28, 1939

2,148,756

UNITED STATES PATENT OFFICE 2,148,756

FILM HANDLING DEVICE

Roy Edward Keys, North Hollywood, Calif., assignor of one-tenth to C. A. Miketta, Beverly Hills, Calif.

Application August 21, 1937, Serial No. 160,290

5 Claims. (Cl. 242—55)

This invention relates to a device for handling unexposed and/or exposed film in strip form. The apparatus of this invention is applicable to the handling of relatively long lengths of films such as are used in motion picture photography, or shorter lengths such as are employed in ordinary cameras and photographic devices, and is particularly designed to facilitate the loading and unloading of magazines and cartridges with photographic film without the necessity of employing a dark room.

Heretofore when it was desired to fill a cartridge or other small film magazine with unexposed film from a roll it was necessary to conduct the operation in a dark room. Amateurs everywhere and professional photographers under many conditions do not have a dark room available. Furthermore, many amateurs attempt to conduct the loading and unloading operations in an improvised dark room without suitable non-actinic light sources and many feet of film are wasted and much time consumed by reason of the expedients resorted to. The present invention obviates all of the difficulties heretofore encountered and provides a device which is compact, self-contained, substantially light-tight and in which both exposed and unexposed film may be readily handled from magazine to magazine or from cartridge to magazine.

As stated hereinabove, the apparatus of this invention may be used in handling films differing widely in length and width but is particularly well adapted for use in handling relatively narrow strip film such as 35 millimeter motion picture film which is used in many of the so-called amateur cameras employed by amateurs and professional photographers alike.

An object of this invention, therefore, is to disclose a device which facilitates the loading and unloading of cartridges or magazines with strip photographic film.

Another object of the invention is to provide a device in which strip film from a magazine may be transferred onto a removable cartridge having a smaller capacity than said magazine, without the necessity of employing a dark room.

Another object is to provide a device whereby the loading and unloading of magazines with strip photographic film may be conducted in daylight without fogging or otherwise impairing the emulsion on said film.

These and other objects, advantages, uses and adaptations of the invention will become apparent to those skilled in the art from the following detailed description of an illustrative form of apparatus. This description will be particularly directed to a form of device adapted for use in handling 35 millimeter film and reference will be had to the appended drawing, in which:

Fig. 1 is a perspective view of the device in closed position.

Fig. 2 is a side elevation of the device partly broken away, illustrating steps performed in using the device.

Fig. 3 is a plan view of Fig. 2.

Fig. 4 is a vertical section taken along the plane IV—IV of Fig. 3.

Fig. 5 is a vertical section taken along the plane V—V of Fig. 3.

Generally stated, the device of this invention comprises a light-tight housing preferably made of sections capable of being placed together so as to form one complete light-tight housing. Removably positioned within said housing are film magazines. One of these magazines may be used for containing unexposed film while the other may be used as a storage receptacle for exposed film.

The device also includes a cradle or holder for a cartridge of the type normally used in cameras, which cartridge may be filled with film from one of the magazines whenever it is desired to load a cartridge. In the event the cartridge contains exposed film, such exposed film may be transferred to another magazine such as, for example, the one in which exposed film is being accumulated. The operations of transferring film from one magazine to another or from a magazine to a cartridge and vice versa are performed within the housing and if desired even in direct sunlight so that no dark room or other precautions need be taken in conducting the operations described.

As shown in the drawing, the device may comprise a pair of housing sections such as the sections 1 and 2 pivotally connected together as at the hinge 3. Each of said housing sections may be rounded at its closed end, the open ends of the sections being suitably stepped as indicated at 4, so as to form a substantially light-tight joint when said sections are placed in contact with one another to form a completed housing. In closed position the two sections may be releasably held as by means of a latch 5 shown in Fig. 1.

Each of the housing sections is provided with a magazine or other suitable container for film. A magazine is indicated at 6 and said magazine may be provided with a reel 7 upon which strip film may be wound. The reel 7 may be provided with a spindle or hub 8 journaled in a port formed in the side wall of the magazine 6. The magazine is also provided with a closure through which the reel may be withdrawn when desired. In the drawing the magazine 6 is shown provided with a closure member 9 frictionally retained in position on the magazine and provided with a transverse opening 10 through which the film 11 may be moved. The film edges of the opening 10 are preferably covered with velvet 12 so as to render the opening substantially light-tight. A small roller or journaled rod 13 may be mounted on the closure member 9 for the purpose of guiding the film 11 and preventing the emulsion of the film from being scratched. A similar magazine 6' is preferably releasably retained in the housing section 2. The housing section 2 carries a knob or handle member 15 which is yieldably urged into the port formed in the side of the magazine 6' so as to cause the shaft of the handle member 15 to engage with the hub or spindle 8' of the reel 7' contained in said magazine 6' so that rotation of the handle 15 imparts a similar rotation to the reel within said magazine.

The device to the extent described hereinabove may be used in transferring film, such as the film 11, from a magazine 6 into the magazine 6' by simply connecting the end of the film 11 to a leader 14 attached to the reel 7'. The housing sections 1 and 2 are then moved into closed position and latched together as by the latch 5. By actuating the handle 15, film is withdrawn from the magazine 6 into the magazine 6' and this operation can be carried out even though the entire housing is handled under daylight conditions.

In the more specific form of device the apparatus is provided with a cradle or cartridge holder 20 comprising a bottom member 21 provided with upstanding end portions 22 and 23. The entire cradle is pivotally connected to either one or both of the housing sections and as shown in the drawing it is pivotally connected to the hinge 3. One end of the cradle 20, such as the end 23, carries a hollow bushing 19 through which extends a shaft 25 attached to a handle or knob 24, the head of the shaft 25 being suitably urged inwardly as by means of a spring. It is to be understood that the handle member 15 may be constructed in the same manner as that described for the handle member 24. Suitable indentations 26 and 27 are formed in the housing sections 1 and 2 so that when the device is closed, the shaft of the handle member 24 fits snugly but rotatably into the indentations 26 and 27. A cartridge 30 of the type generally used in cameras and adapted to contain a short length of film is releasably held upon the cradle 20 by means of the shaft 25 attached to the handle member 24.

Rotation of the handle member 24 will impart rotation to the spindle 28 contained within the cartridge 30. In order to suitably support and center the cartridge 30, the cradle 20 may be provided with a curved supporting plate 32 pivotally connected as at 33 to the end members 22 and 23 of the cradle. Since in many instances it is desirable to trim the ends of a strip film in the form of a V in order to facilitate threading of a camera and engagement of the ends of a film with a spool or spindle, the curved supporting plate 32 may be attached to a hardened metal plate 34 having a V cut therein, as indicated by dotted lines in Fig. 3 at 35. This plate 34 is movable with the curved supporting plate 32 about the pivot point 33. The bottom member 21 of the cradle may be provided with a V-shaped hardened metal member 36 adapted to fit in shearing relation into the V 35 cut in the plate 34. When the curved supporting member 32 and the plate 34 are lifted upwardly on the pivotal points 33 and a piece of film is then placed on the top of member 36, downward pressure of the supporting plate 32 and member 34 will cause the edges of the member 36 to threadedly cooperate with the V 35 cut in the plate 34 so as to cut a V in the film.

In operations which involve the loading of a cartridge from a supply of film carried in a magazine or the discharge of an exposed film from a cartridge into another magazine, the following operations would be performed: the magazine 6, for example, may be filled with unexposed film whereas the magazine 6' is used as a receptacle for exposed film. These magazines may have a capacity of say 50 feet of 35 millimeter film whereas a normal cartridge such as the cartridge 30, will only take about 3 feet of such film. The end of film 11 from the storage magazine 6 is cut into a V by action of the members 34 and 36, as described hereinbefore, and the end of such film fastened onto the spindle 28 within the cartridge 30. The cartridge 30 is then mounted upon the cradle 20 and the longitudinal velvet lined openings 29 of said cartridge 30 brought in close proximity with the opening 10 in the cover of the magazine 6 by pivoting the entire cradle 20 so that the shaft of the handle member 24 is supported by the semicircular opening 26 in the wall of housing section 1. The two housing sections are then brought together and fastened as by means of the latch 5 so as to assume the position shown in Fig. 1. Rotation of the handle member 24 in the direction of the arrow will thereupon cause film 11 to be fed from the reel 7 into the cartridge 30. Means are provided whereby during rotation of the handle 24 the cartridge 30 will not be rotated and such means may comprise a pad 38 of rubber or other yielding material suitably fastened to the cover 9 of the magazine and adapted to yieldably press against the cartridge or hold the cartridge in position when the housing sections are latched together.

When the cartridge is filled, the operator will take cognizance of the fact that increased resistance to movement of the handle 24 indicates that the cartridge 30 is filled. The device is then opened by unlocking the latch 5 and swinging the housing sections apart and the film exposed between the opening 10 and the opening 29 is severed. The now filled cartridge may be removed from the cradle and if desired the end of the film protruding from said cartridge may be trimmed into a V by operation of the plate 34 and the member 36 as described hereinbefore.

After exposure of the film in a camera the exposed film will be found in a similar cartridge which is now placed in the cradle 20 and the end of the film attached to the leader 14 extending from the magazine 6'. Such attachment may be caused by the use of an adhesive, clip, tape, gummed label, or the like. The cartridge is rotated within this cradle so that the longitudinal slot through which the exposed film extends is in close proximity to the leader 14 and the top of magazine 6'. The housing sections are again closed and handle member 15 is turned in the direction of the arrow. This causes the film to be withdrawn from the cartridge onto the reel within the magazine 6'. When resistance is encountered, it will be known that substantially all of the film has been withdrawn, the dead end of the film being still retained within the cartridge by reason of the fact that it is held upon the spindle within said cartridge. The housing can again be opened and the cartridge removed from its cradle, opened, and the dead end of the film allowed to protrude slightly from the magazine 6'.

It will be evident to those skilled in the art that although a particular form of apparatus has been described in detail, numerous changes and modifications may be made. Whenever a cradle or similar holder for cartridges is employed, the housing should be of a size sufficient to accommodate such cartridge between the two magazines removably held within the housing. The device permits a photographer to carry a supply of film in one of the magazines and accumulate his exposed strips in another magazine so that when it is desired to submit the exposed films to a developing process, it is only necessary to withdraw the entire magazine from the housing and then in the laboratory dismantle the magazine so as to withdraw the exposed film for developing purposes.

The size and proportions of the housing may vary with the size of the reels or magazines which are to be handled. 500 or even 1000 feet magazines may be used for motion picture photography. Construction of the magazines may also vary since the film and reels contained therein may be removable either through the top or the side of such magazines as desired. All changes and modifications coming within the scope of the appended claims are embraced thereby.

I claim:

1. In a film handling device, a pair of housing sections adapted to be releasably held together to form a substantially light-tight housing; a light-tight film magazine provided with a reel and a substantially light-tight opening in its edge portion adapted to receive and guide film to and from said reel, said film magazine being removably positionable within one of said housing sections; a similar film magazine removably positioned within the other of said housing sections; a handle member carried by a housing section and releasably engageable with a reel within a magazine for rotating said reel from the exterior of said housing; a cradle adapted to releasably hold a film cartridge, said cradle being adjustably positionable between said magazines; and a handle member carried by said cradle and extending to a point exteriorly of said housing, said handle member being releasably engageable with a cartridge in the cradle.

2. In a film handling device, a pair of housing sections adapted to be releasably held together to form a substantially light-tight housing; a light-tight film magazine provided with a reel and a substantially light-tight opening in its edge portion adapted to receive and guide film to and from said reel, said film magazine being removably positionable within one of said housing sections; a similar film magazine removably positioned within the other of said housing sections; a handle member carried by a housing section and releasably engageable with a reel within a magazine for rotating said reel from the exterior of said housing; a cradle adapted to releasably hold a film cartridge, said cradle being pivotally attached to said housing sections between said magazines; and a handle member carried by said cradle and extending to a point exteriorly of said housing, said handle member being releasably engageable with a cartridge in the cradle, said handle member extending to beyond the housing sections.

3. In a device of the character defined in claim 1, the provision of means for preventing rotation of the cartridge case when the handle member carried by the cradle is actuated.

4. In a device of the character defined in claim 2, the provision of means for preventing rotation of the cartridge case when the handle member carried by the cradle is actuated.

5. In a device for handling strip film, the combination of: a pair of housing sections, each provided with one open end, said sections being adapted to fit together to form a substantially light-tight housing; releasable lock means for releasably holding said housing sections together; a removable magazine provided with a light-tight closure and a substantially light-tight film opening non-rotatably positioned in each housing section; a reel in each of said magazines; means carried by a housing section and releasably engageable with a reel within a magazine positioned in said housing section for rotating said reel; and means pivotally attached to said housing between said magazines for releasably holding a film cartridge; and handle means extending to beyond said housing for winding film into said cartridge, said handle means being adapted to releasably engage a reel within said film cartridge.

ROY EDWARD KEYS.